United States Patent
Rong et al.

(10) Patent No.: US 9,495,168 B2
(45) Date of Patent: Nov. 15, 2016

(54) ALLOCATION OF ALIAS REGISTERS IN A PIPELINED SCHEDULE

(71) Applicant: Intel Corporation, Santa Clara, CA (US)

(72) Inventors: Hongbo Rong, San Jose, CA (US); Cheng Wang, San Ramon, CA (US); (Continued)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 14/126,466

(22) PCT Filed: May 30, 2013

(86) PCT No.: PCT/US2013/043224
§ 371 (c)(1),
(2) Date: Dec. 16, 2013

(87) PCT Pub. No.: WO2014/193375
PCT Pub. Date: Dec. 4, 2014

(65) Prior Publication Data
US 2015/0039861 A1    Feb. 5, 2015

(51) Int. Cl.
*G06F 9/38* (2006.01)
*G06F 9/46* (2006.01)
(Continued)

(52) U.S. Cl.
CPC ........... *G06F 9/3838* (2013.01); *G06F 9/3017* (2013.01); *G06F 9/30127* (2013.01); *G06F 9/384* (2013.01);
(Continued)

(58) Field of Classification Search
CPC .................. G06F 9/3836; G06F 9/3838; G06F 9/384; G06F 9/30127; G06F 9/3017;
(Continued)

(56) References Cited

U.S. PATENT DOCUMENTS 5,958,048 A  *  9/1999  Babaian .................. G06F 8/441
                                                              712/241
6,826,677 B2 * 11/2004  Topham ................... G06F 8/441
                                                              712/216
(Continued)

FOREIGN PATENT DOCUMENTS

WO          9806039       2/1998
WO       2013048379       4/2013

OTHER PUBLICATIONS

Australian Government IP Australia, "Patent Examination Report No. 1," mailed Aug. 17, 2015, in Australian Application 2013387185.
(Continued)

*Primary Examiner* — Daniel Pan
(74) *Attorney, Agent, or Firm* — Trop, Pruner & Hu, P.C.

(57) ABSTRACT

In an embodiment, a system includes a processor including one or more cores and a plurality of alias registers to store memory range information associated with a plurality of operations of a loop. The memory range information references one or more memory locations within a memory. The system also includes register assignment means for assigning each of the alias registers to a corresponding operation of the loop, where the assignments are made according to a rotation schedule, and one of the alias registers is assigned to a first operation in a first iteration of the loop and to a second operation in a subsequent iteration of the loop. The system also includes the memory coupled to the processor. Other embodiments are described and claimed.

19 Claims, 7 Drawing Sheets

(72) Inventors: Hyunchul Park, Santa Clara, CA (US); Youfeng Wu, Palo Alto, CA (US)

(51) Int. Cl.
*G06F 9/30* (2006.01)
*G06F 9/45* (2006.01)

(52) U.S. Cl.
CPC .............. *G06F 9/3834* (2013.01); *G06F 8/434* (2013.01); *G06F 8/441* (2013.01); *G06F 8/443* (2013.01)

(58) Field of Classification Search
CPC .................... G06F 9/3834; G06F 8/441; G06F 8/443; G06F 8/434
USPC ................................................. 712/216, 217
See application file for complete search history.

(56) References Cited

U.S. PATENT DOCUMENTS

| | | | |
|---|---|---|---|
| 2002/0133813 A1* | 9/2002 | Ostanevich | G06F 8/452 717/150 |
| 2003/0005420 A1 | 1/2003 | Ghosh et al. | |
| 2003/0154363 A1* | 8/2003 | Soltis, Jr. | G06F 9/3824 712/217 |
| 2003/0237080 A1 | 12/2003 | Thompson et al. | |
| 2004/0025153 A1* | 2/2004 | Johnson | G06F 8/4452 717/161 |
| 2012/0260072 A1 | 10/2012 | Wang et al. | |

OTHER PUBLICATIONS

International Searching Authority, "Notification of Transmittal of the International Search Report and the Written Opinion of the International Searching Authority," mailed Feb. 18, 2014, in International application No. PCT/US2013/043224.
Japan Patent Office, Notice of Reasons of Rejection mailed Jan. 5, 2016 in Japanese Patent Application No. 2015-520204.
Gallagher, et al: "Dynamic Memory Disambiguation Using the Memory Conflict Buffer", PLDI09 :Proceedings of the 2009 ACM SIGPLAN Conference On Programming Language Design And Implementation; Jun. 15-20, 2009, Dublin, Ireland; SIGPLAN Notices : A Monthly Publication Of The Special Interest Group On Programming Languages Of The AS, vol. 29, No. 11, Nov. 1, 1994 (Nov. 1, 1994), pp. 183-193, XP000491733.
European Patent Office, Extended European Search Report mailed Jun. 10, 2016 in European Patent Application No. 13885974.9.
Korean Intellectual Property Office, Notice of Preliminary Rejection mailed Jun. 28, 2016 in Korean Patent Application No. 10-2014-7036540. (Translation Redacted).

\* cited by examiner

For (i=0; i<N; i++) {
   a
   b
}

ALLOCATION OF ALIAS REGISTERS IN A PIPELINED SCHEDULE

TECHNICAL FIELD

Embodiments relate to pipeline scheduled operations.

BACKGROUND

A task commonly handled by a compiler is memory disambiguation, which may include detection of unaliased memory accesses, e.g., loads or stores that visit different memory locations. These operations may be scheduled to run out of order for better instruction-level parallelism. In contrast, memory operations that visit the same memory location(s) are labeled as "aliased," and cannot be scheduled out of order.

Memory disambiguation often is included in compiler optimization, e.g., software pipelining. Software pipelining can exploit instruction-level parallelism for a loop by overlapping execution of successive iterations. However, overlap of execution of operations in successive iterations can produce aliases.

DETAILED DESCRIPTION

For optimizations performed at run-time, hardware support may be used to accomplish memory disambiguation. In embodiments of the present invention, hardware support may include a register file (e.g., a rotating register file) that includes a plurality of memory access registers ("alias registers"), which may be applied to cyclic code such as a loop that includes a plurality of operations to be executed for a plurality of iterations. In an embodiment, the alias registers may be applied to a software-pipelined schedule of a loop to effect memory disambiguation and to discover aliases at run-time.

For example, during a schedule phase, memory accesses (e.g., load operations or store operations, "operations" herein) within the loop can be assumed to be not aliased ("data speculation"), e.g., it can be assumed that there is no dependence (e.g., ordered relationship) among memory accesses. While data speculation enables more parallelism (e.g., efficient use of computational resources through out of order processing of operations), it may also lead to errors.

For instance, if the memory accesses happen to alias with each other (e.g., the memory accesses are directed to overlapping memory locations) and if the order of the memory accesses in an execution schedule is different from their order in the original loop, then the data speculation is wrong, e.g., the data speculation fails. To catch this case that would result in an alias, each memory access can be allocated an alias register that records a memory range of addresses (e.g., starting address and extent of memory accessed) of the access when the access is executed. The memory range of the access may be compared with the alias registers of all potentially aliased accesses and if there is a match, an alias is identified, e.g., failure of data speculation. Such a failure may be handled by, e.g., execution of recovery code. In some embodiments the execution of the recovery code may result in a roll-back to a previous iteration of the loop, and/or re-ordering of the operations to eliminate the alias.

There are generally two kinds of alias registers: static and rotating. Static alias registers are used differently from rotating alias registers, e.g., in how comparison of registers is encoded in an instruction. To perform the comparison with a static alias register, a register number of the static alias register may be explicitly encoded. In contrast to static registers, rotating alias registers are typically not compared individually. Instead, only one register number is encoded and all registers are compared, starting from the encoded register, up to the largest numbered register. This technique may solve the encoding but may produce false positives, e.g., if registers are not allocated properly.

Note that for a rotating alias register file, the comparison may be "uni-directional," e.g., the comparison may be "upward checking" toward the largest numbered register, and not "downward." There may be a base pointer that points to the alias register file. In a "rotation," the base pointer is moved up, and all the registers are cleaned, from the original to the current register pointed to by the base pointer.

Embodiments of the present invention may use the rotating alias registers in software pipelining. Herein, "registers" or "alias registers" usually refers to "rotating alias registers."

Figure 1:
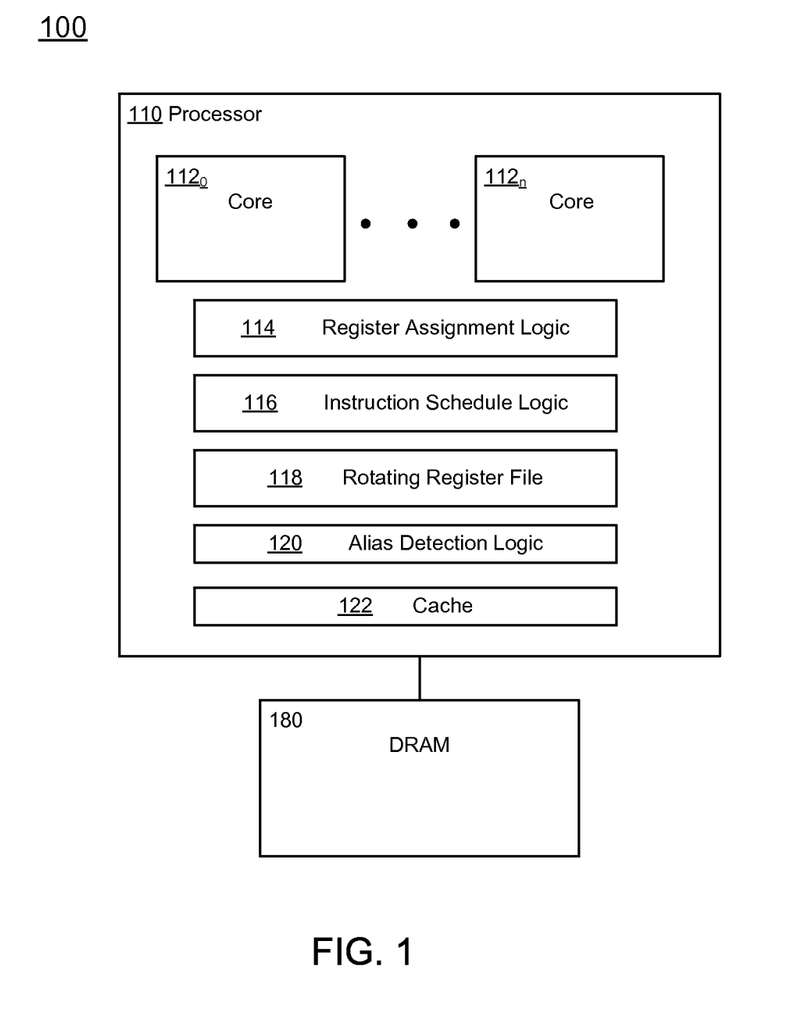
FIG. 1 is a block diagram of a system to schedule alias registers, according to an embodiment of the present invention.

FIG. 1 is a block diagram of a system 100 to schedule alias registers, according to embodiments of the present invention. The system 100 includes a processor 110 coupled to a dynamic random access memory (DRAM) 180. The processor 110 may include a plurality of cores $112_0$, $112_1$ . . . $112_n$ to execute instructions. The processor 110 may include register assignment logic 114, instruction schedule logic 116, rotating register file 118, alias detection logic 120, and one or more cache memories including cache 122. In embodiments, one or more of the register assignment logic 114, the instruction schedule logic 116, and the alias detection logic 120 may be software, hardware, firmware, or a combination thereof. For example, the register assignment logic 114 may include software that is to be executed by execution hardware, or dedicated firmware, or dedicated circuitry, or a combination thereof. The instruction schedule logic 116 may include software, hardware, firmware, or a combination thereof. For example, the instruction assignment logic 114 may include software that is to be executed by execution hardware, or dedicated firmware, or dedicated circuitry, or a combination thereof.

In operation, the instruction schedule logic 116 may create a schedule of operations for execution of a loop (e.g., a defined group of operations that is to be executed iteratively for a plurality of N iterations). The instruction schedule logic 116 may schedule the operations (e.g., software pipelining) in order to achieve efficient use of available computation resources.

As a result of software pipelining, the execution schedule produced by the instruction schedule logic may result in a different order of execution as compared with the order of execution of the operations specified in the loop. For example, a loop of two operations, operation a followed by operation b, may be scheduled by the instruction schedule logic 116 so that for each iteration operation b is executed after which operation a is executed, in order to efficiently utilize available computational resources.

The register assignment logic 114 may assign each alias register of a set of alias registers in the rotating register file 118 to a corresponding operation of the loop, for each of the plurality of iterations of the loop. In an embodiment, each alias register of the rotating register file 118 may be assigned more than once, e.g., the alias registers may be assigned to successive operations, rotating through the plurality (e.g., a finite number) of alias registers, provided that no alias register is assigned to two operations at the same time.

Each alias register may be used to store memory access data, e.g., memory address ranges of one or more memory locations in the cache 122 or in the DRAM 180 that are accessed by the corresponding operation of the loop. In an embodiment, contents of one of the alias registers may be compared to contents of several other of the alias registers of the rotating register file 118, by the alias detection logic 120, to determine whether an alias exists, e.g. access (via, e.g., load operation or store operation) to a common memory location in a same time frame.

Figure 2A:
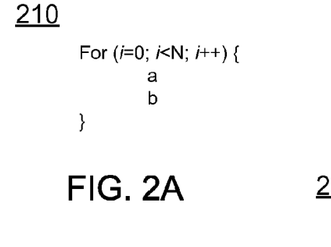
FIGS. 2A, B, C illustrate an alias register allocation scheme, according to an embodiment of the present invention.
Figure 2B:
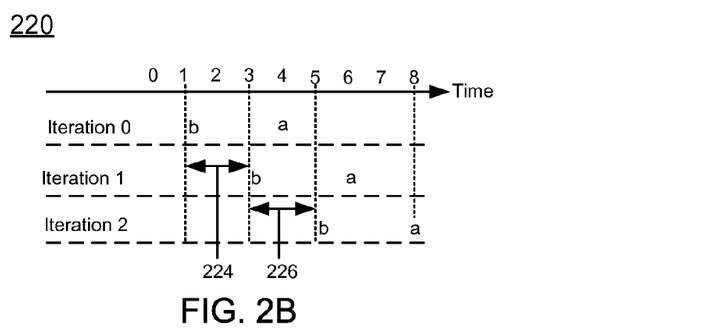
Figure 2C:
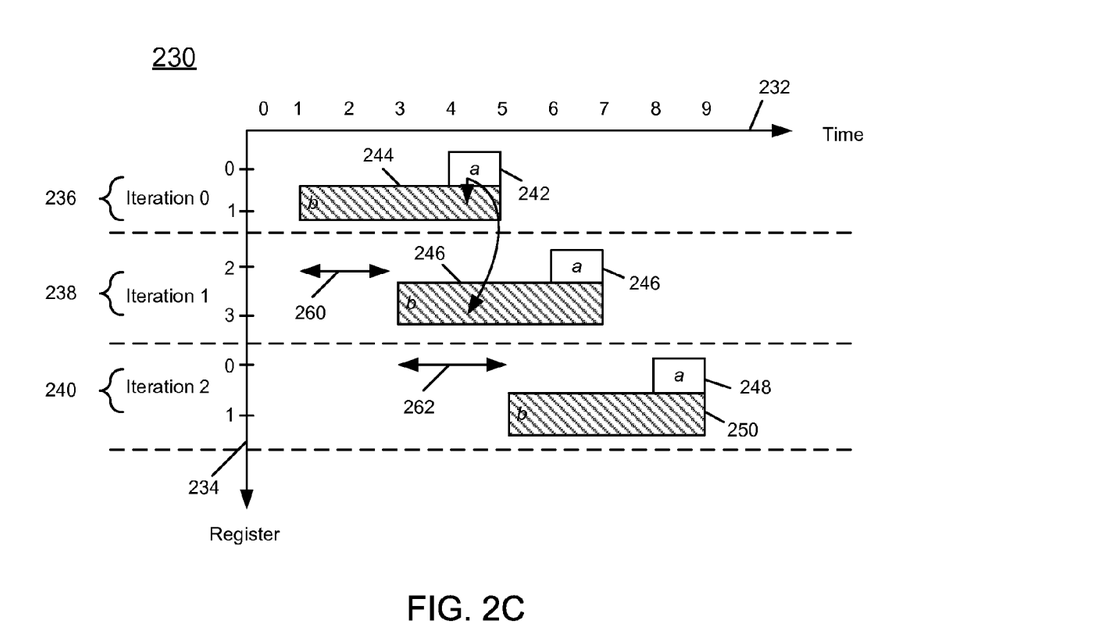

FIGS. 2A, B, C illustrate a register allocation scheme, according to an embodiment of the present invention. In FIG. 2A, as an exemplary loop, pseudocode loop 210 includes operation a and operation b. Both operations a and b are memory accesses, e.g., load or store operations ("operations" herein).

For N=3, the loop 210 performs 3 iterations, e.g., i=0, 1, 2. Note that in the loop described by pseudo code 210, operation a is executed before operation b in the same iteration, and operation a also is executed before all a operations and all b operations in subsequent iterations.

In FIG. 2B, a software pipelined schedule 220 for the loop is depicted. In the software pipelined schedule 220, within iteration 0 operation a is scheduled to be executed after operation b executes. In iteration 1 operation a is scheduled to be executed after operation b executes. In iteration 2 operation a is scheduled to be executed after operation b executes. Reordering of the operations as compared with the loop 210 may cause aliases, which may be detected through use of runtime alias monitoring. Alias registers may be allocated to achieve the runtime alias monitoring.

In FIG. 2C, an alias register allocation scheme 230 represents a solution according to an embodiment of the present invention. X axis 232 indicates time and Y axis 234 indicates a register number associated with a corresponding alias register. Bars 242-250 represent "lifetimes" of the operations. A lifetime of a first operation may be defined as a time period that begins with execution of the first operation ("producer operation") and ends at execution of a second operation that may alias with the first operation before completion of the second operation. Each lifetime is labeled with the corresponding producer operation. For example, the lifetime 244 begins at time t=1 at which execution of operation b starts, and ends at t=5, the time at which execution of operation a ends (e.g., instruction b in iteration 0 has associated lifetime 244).

The allocation scheme 230 allocates alias registers to each operation of the loop within each iteration (for N=3, the iteration i=0, 1, 2). For loop iteration i, the lifetimes of a and b are allocated register $2*i$ and $2*i+1$ respectively.

For example, in iteration 236 (i=0, iteration 0) at time=4 on the time axis 232, operation a begins execution. The memory access address range of operation a, to be stored in an alias register 0, may be compared with the stored access ranges of each of the higher numbered alias registers, starting from register 1 to the largest numbered register associated with an active operation, e.g., registers 1 and 3, which are allocated to operation b in the $1^{st}$ iteration 236 and in the $2^{nd}$ iteration 238. (Register 2 is allocated to operation a in iteration 238, which is to be executed following completion of lifetime 242 of the operation a in iteration 236, and so is not considered). In this manner, an alias can be caught dynamically through comparison of the memory access range stored in a first assigned alias register, with stored memory access ranges stored in subsequent assigned alias registers.

Note that at time t=5 lifetimes 242 and 244 of iteration 236 ("iteration 0") have expired, and therefore beginning at t=5 no additional comparisons contents of assigned registers for the lifetimes 242 and 244 of the first iteration 236 will be made. Consequently, registers 0 and 1 may be re-used in iteration 240 ("iteration 2"), which begins at t=5.

In the example of alias register allocation scheme 230, a set of four rotating registers (numbered 0-3) is sufficient to detect instances of aliases due to, e.g., overlapping use of memory locations for the loop 210. The loop 210 as executed according to the pipeline schedule 220, has an iteration interval (224, and also 226) Δt=2, which is a time interval between starts of successive iterations. The iteration interval (260, and also 262) in the register allocation scheme 230 is also Δt=2.

The alias registers can be allocated so that a total of 4 rotating registers are sufficient to conduct the comparisons to detect aliases. For loops that include more than two operations with more complex software pipelining schemes, a larger set of rotating registers may be needed to detect each instance of an alias. For any value of N, a finite set of alias registers (smaller than N) may be allocated on a rotating basis, e.g., beginning at a first alias register and continuing through a largest numbered alias register and repeating cyclically, to enable detection of aliases.

Figure 3:
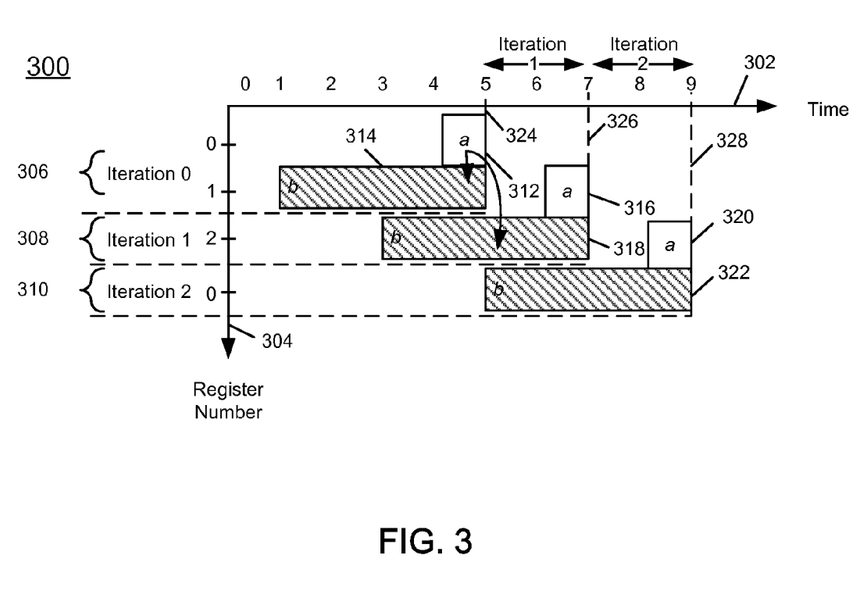
FIG. 3 is an illustration of an alias register allocation scheme, according to another embodiment of the present invention.

FIG. 3 is an illustration of a register allocation scheme 300, according to another embodiment of the present invention. The register allocation 300 aims to reduce the number of alias registers without changing the software pipelined schedule.

Time axis 302 may measure a lifetime of each operation a and b. Register axis 304 may indicate which alias register is assigned to store a corresponding memory access range (e.g., address range within a memory such as DRAM 180 of FIG. 1) for each operation. For instance, in the iteration 306 ($0^{th}$ iteration) register 0 is to store the memory access range associated with operation a that has lifetime 312, and register 1 is to store the memory access range associated with operation b that has lifetime 314. The operation a, as shown in pseudocode 210 of FIG. 2, is intended to occur prior to operation b.

To ensure that no alias exists between operations a and b of the first iteration, in scheme 300 of FIG. 3 the lifetime 314 of operation b extends to the end of the lifetime 312 of operation a and the alias register 1 is assigned to operation b for the lifetime 314. In the register allocation 300, the lifetime of operation a in an iteration is above the lifetimes of operation b in the same iteration and the next iteration, and the check for aliases includes from alias register 0 to alias register 1 ("upward" in numerical order of the rotating alias registers). Further, because the lifetime 312 of operation a in the iteration 306 ("iteration 0") happens during the lifetime 318 of operation b in iteration 308 ("iteration 1"), contents of register 0 may be compared with contents of register 2 to determine whether an alias exists between operation a during lifetime 312 and operation b during lifetime 318.

Note that lifetime 314 is complete at t=5. Looking at the iteration 308 ("iteration 1"), it can be seen that alias register 1 can be used to store the associated memory access range of operation a included in the iteration 308 with lifetime 316 because lifetime 314 is complete and has no use for register 1 beyond the lifetime 314. Dashed lines 324 and 326 indicate boundaries of iteration 308 (iteration 1) that includes execution of operation b with lifetime 318 and assigned register 2, and execution of operation a with lifetime 316 and assigned register 1.

Thus, the registers can be assigned cyclically, e.g., register 1 may be utilized to store the memory access range of operation b in iteration 306 during lifetime 314 (e.g., time interval $\Delta t = 1 \rightarrow 5$), and register 1 may also be utilized in iteration 308 to store the memory access range for operation a during lifetime 316 (e.g., time interval $\Delta t = 6 \rightarrow 7$).

Iteration 310 ("iteration 2") is bounded by dashed lines 326 and 328, and includes execution of operation b with lifetime 322 ($\Delta t = 5 \rightarrow 9$) using register 0 to store the memory access range of operation b, and execution of operation a with lifetime 320 ($\Delta t = 8 \rightarrow 9$) using register 2 to store the memory access range of operation a of iteration 310, because lifetime 318 has expired at t=7, which frees up register 2 for reuse in iteration 310. Thus, register 2 is reused ("register reuse") in successive iterations, e.g., in iteration 308 during lifetime 318 of operation b, and also in iteration 310 during lifetime 320 of operation a. This register reuse technique in successive iterations can result in a reduction of a total number of registers used to detect aliases during execution of a loop, such as loop 210 of FIG. 2. Further, in register allocation 300, the set of registers 0, 1, 2, may be used cyclically, e.g., register 0 is used in iteration 306 ("iteration 0") during lifetime 312 ($\Delta t = 4 \rightarrow 5$) and again in iteration 310 ("iteration 2") during the lifetime 322 ($\Delta t = 5 \rightarrow 9$).

Use of rotating allocation of alias registers for a software-pipelined schedule of a loop can be considered transformation of a register allocation problem into a cyclic scheduling problem. Each dependence (relationship of operations based upon an order of execution of the operations) may be considered to have a dependence distance, e.g., number of iterations between dependent operations. For example, in FIGS. 2 and 3, there are two dependences:

1) a→b with a distance (e.g., distance between iterations) of zero (e.g., same iteration), which means the lifetime of operation a in a same iteration is to be assigned the same or a smaller-numbered register than the lifetime of operation b.

2) a→b with a distance of one (adjacent iterations), which means the lifetime of operation a in an iteration is to be assigned the same or a smaller-numbered register than the lifetime of operation b in the adjacent iteration so that rotating alias registers will be checked in a numerically "upward" order of the rotating registers.

In an embodiment of the present invention, based on the dependence graph, a "software pipelined schedule for the lifetimes" can be created by treating a lifetime as an operation, and a software pipelining algorithm can be applied to schedule the lifetimes.

The scheduling approach can be formalized, formulating the register allocation problem as "scheduling" lifetimes into registers. For example, let a(i) be the operation a in loop iteration i, and let r(a, i) be the register allocated to it by the schedule.

The schedule respects the following constraints:

(1) Modulo constraint: $r(a, i) = r(a, 0) + i \ast C$, for all i. Here C is a constant to be determined by the scheduler. That is, the lifetimes of an operation appear in a constant period in terms of registers in the schedule. For example, in block 230 of FIG. 2, the lifetimes of operation a appears in a constant period C=2 (in register 0 and 2); in FIG. 3, the lifetimes of operation a appear in a constant period C=1 (in register 0 and 1);

(2) Dependence constraint: Suppose a(i) and b(i+d), where d≥0, may be aliased, and a(i) is before b(i+d) in the original execution order, but they are reordered in the software pipelined schedule of the loop. To make sure any alias is caught during runtime, we let $r(a, i) \leq r(b, i+d)$ for all i. That is, a(i) is to be assigned the same register as b(i+d) or a smaller numbered register in order for a(i)'s memory address range to be compared with b(i+d)'s memory address range. This is because of the rotating register file's uni-directional comparison feature. This constraint can be modeled by a dependence a→b with a distance equal to d and a latency (in terms of registers) of 0.

(3) Resource constraint: If the lifetimes of two operations are overlapping in time, they cannot be assigned the same register.

Traditional software pipelining has two dimensions: resources and time. It schedules operations to time at a constant period (Initiation Interval, "II"), respecting all dependence and resource constraints. In the register allocation presented herein, registers may be treated in the same manner as "time," time may be treated as a "resource," lifetimes may be treated as "operations", and alias checking as "dependence."

Operationally, the following considerations may be taken into account to arrive at a schedule, according to embodiments of the present invention:

1. Dependence building.

A dependence a→b with a distance d (number of iterations between a and b) is added to a dependence graph according to the above dependence constraints, except when d=0 but a is after b in the same iteration in the original execution order.

Further, the following dependence can be added to avoid false-positives, as long as it does not complete a local cycle in the dependence graph, where a local cycle is composed of dependences whose distances are all 0: Suppose a(i) and b(i+d), where d≥0, may be aliased, and a(i) is before b(i+d) in the original execution order and also in the software pipelined schedule of the loop. In this case, when b(i+d) executes, it should not check a(i) for alias at all. This can be enforced by making sure that b(i+d) is assigned a larger numbered register than a(i). That is, $r(a, i) < r(b, i+d)$ for all i. This can be done by adding a dependence a→b with a distance equal to d and a latency of 1.

False positives can be further minimized by adding the following kind of dependences, as long as they do not complete a local cycle in the dependence graph: For operation a and b from the same iteration, there can be a case that a never checks b. A dependence b→a with a distance equal to zero and a latency of 1 can be added.

2. Cyclic scheduling.
  (1) Schedule the lifetimes based on local dependences only. That is, consider only the dependences whose distance is 0 and ignore all others. This produces a schedule for the lifetimes in a single loop iteration.
  Various strategies can be employed to prioritize the lifetimes to be scheduled. In an embodiment, a simple scheduling strategy called "first-fit" may be employed: if more than one lifetime is ready to be scheduled, prioritize the one with the earliest start time.
  (2) Assume the lifetimes of every loop iteration have the same schedule. Overlap the schedules of the lifetimes of two successive loop iterations, considering the ignored dependences. This produces a more compact schedule that can reuse registers between iterations. This local-scheduling-and-compaction approach, together with the first-fit strategy, may effectively reduce false positives.
3. Handling the dependences that were not added to avoid cycle formation in dependence building (above). For each of the omitted dependences a→b, check to determine if it is respected by the schedule. If not, move b to a static alias register.
4. Register assignment and rotation. The register allocation can assume a flat time-space diagram that has infinite number of registers. Map the register numbers in the diagram to those in the rotating register file. Also a rotation instruction can be inserted into the software pipelined schedule of the loop every II cycles, which can "clean up" C number of dead lifetimes each II cycles.

Figure 4:
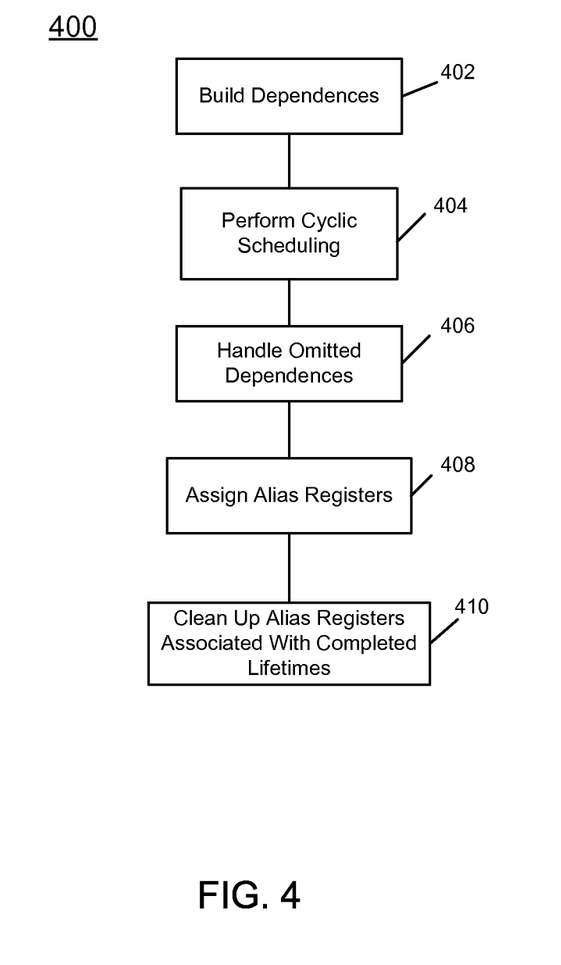
FIG. 4 is a flow chart of a method to schedule alias registers, according to embodiments of the present invention.

FIG. 4 is a flow chart 400 of a method to allocate alias registers, according to embodiments of the present invention. At block 402, dependences may be built between lifetimes. Continuing to block 404, cyclic scheduling is performed, including scheduling lifetimes to registers according to the dependences built and the resource constraints. Advancing to block 406, dependencies that were not considered in block 402 may be handled, e.g., through use of static alias registers. Proceeding to block 408, a plurality of alias registers may be assigned to operations of the loop, e.g., an alias register may be assigned to each operation of the loop in each iteration. The alias registers may be assigned cyclically, with each register assigned for the lifetime of the respective operation, and each register may store an indication of the memory addresses accessed by the respective operation. In some embodiments, at least one register assigned to a first operation in a first iteration may be reused by another operation in a successive iteration beginning after the associated lifetime of the first operation has expired. Thus, the lifetimes of two successive loop iterations may result in a compact schedule that may reuse registers between iterations. Continuing to block 410, a rotation cleanup instruction may be added to the schedule, to be executed in order to clean up (e.g., erase) alias registers associated with completed lifetimes.

Figure 5:
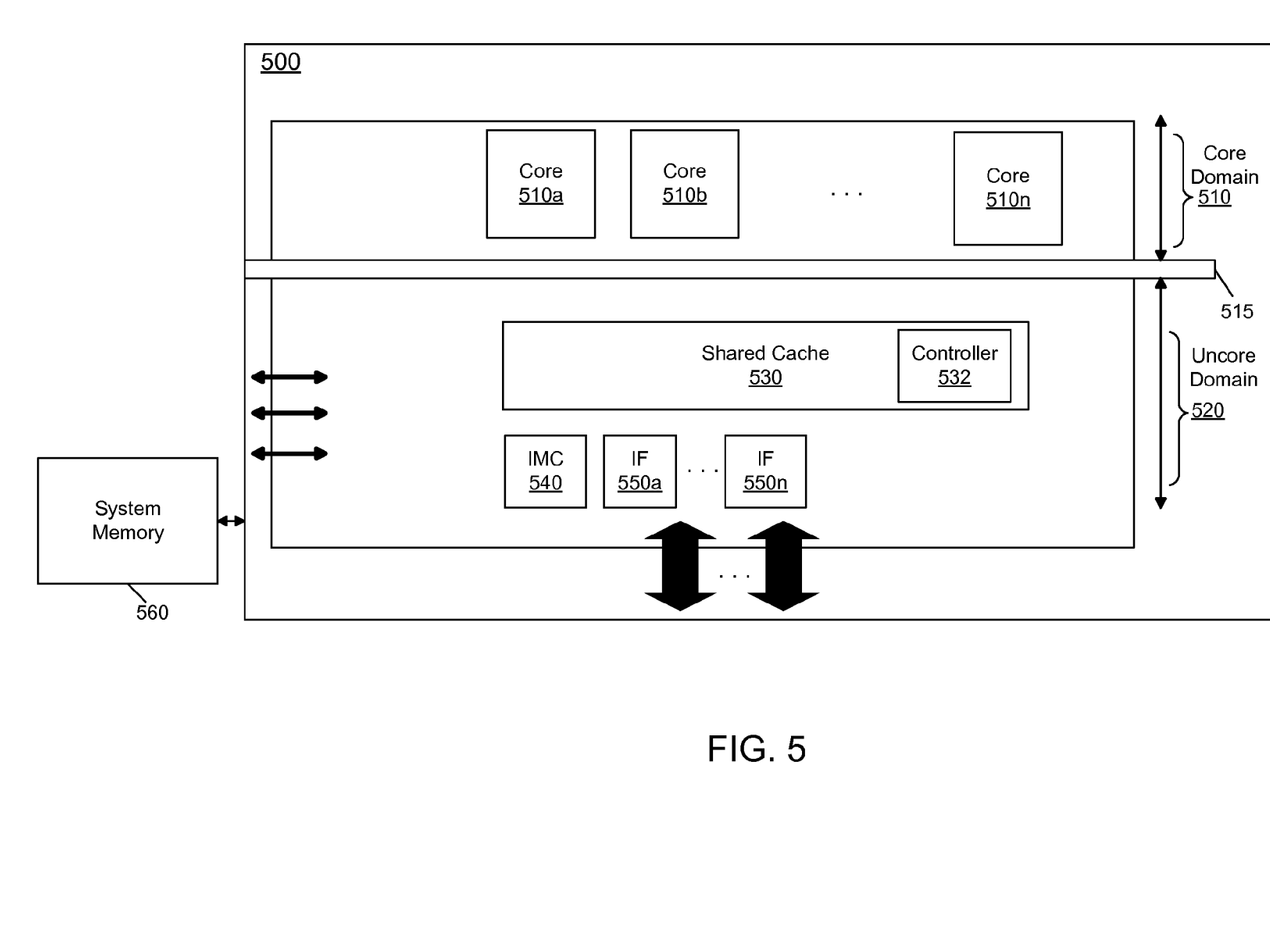
FIG. 5 is a block diagram of a processor in accordance with an embodiment of the present invention.

Referring now to FIG. 5, shown is a block diagram of a processor in accordance with an embodiment of the present invention. As shown in FIG. 5, processor 500 may be a multicore processor including a plurality of cores 510a-510n in a core domain 510. One or more of the cores may include instruction schedule logic, alias registers (e.g., rotating register file), and register assignment logic to assign the alias registers to operations of a loop in accordance with embodiments of the present invention.

The cores may be coupled via an interconnect 515 to a system agent or uncore 520 that includes various components. As seen, the uncore 520 may include a shared cache 530 which may be a last level cache and includes a cache controller 532. In addition, the uncore may include an integrated memory controller 540 and various interfaces 550.

With further reference to FIG. 5, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 5, the scope of the present invention is not limited in this regard.

Figure 6:
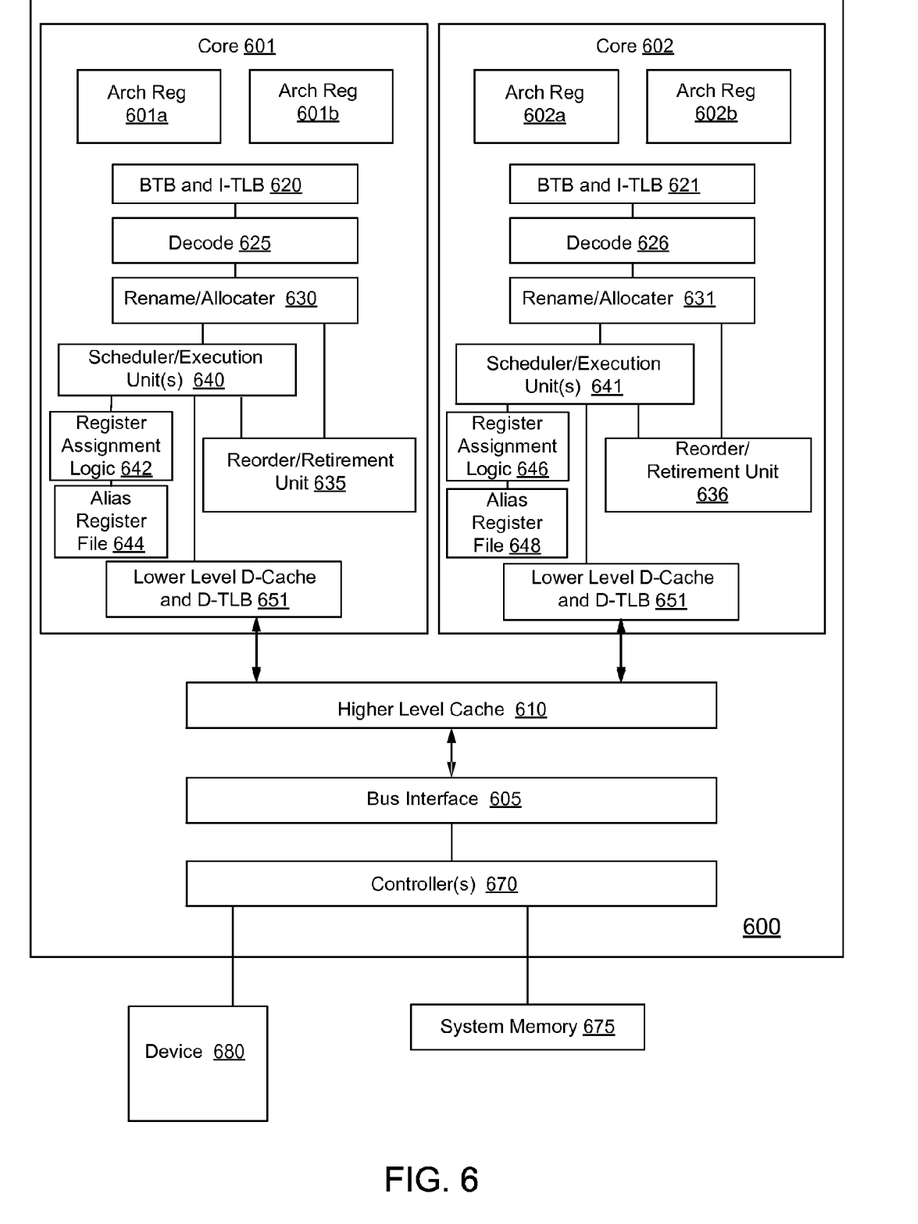
FIG. 6 is an illustration of an embodiment of a processor including multiple cores, according to an embodiment of the present invention.

Referring to FIG. 6, an embodiment of a processor including multiple cores is illustrated. Processor 600 includes any processor or processing device, such as a microprocessor, an embedded processor, a digital signal processor (DSP), a network processor, a handheld processor, an application processor, a co-processor, a system on a chip (SOC), or other device to execute code. Processor 600, in one embodiment, includes at least two cores—cores 601 and 602, which may include asymmetric cores or symmetric cores (the illustrated embodiment). However, processor 600 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, where each independently maintained architectural state is associated with at least some dedicated execution resources. In contrast to cores, a hardware thread typically refers to any logic located on an integrated circuit capable of maintaining an independent architectural state, where the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 600, as illustrated in FIG. 6, includes two cores, cores 601 and 602. Here, cores 601 and 602 are considered symmetric cores, i.e., cores with the same configurations, functional units, and/or logic. In another embodiment, core 601 includes an out-of-order processor core, while core 602 includes an in-order processor core. However, cores 601 and 602 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 601 are described in further detail below, as the units in core 602 operate in a similar manner.

As depicted, core 601 includes two hardware threads 601a and 601b, which may also be referred to as hardware thread slots 601a and 601b. Therefore, software entities, such as an operating system, in one embodiment potentially view processor 600 as four separate processors, i.e., four logical processors or processing elements capable of executing four software threads concurrently. As alluded to above, a first thread is associated with architecture state registers 601a, a second thread is associated with architecture state registers 601b, a third thread may be associated with architecture state registers 602a, and a fourth thread may be associated with architecture state registers 602b. Here, each of the architecture state registers (601a, 601b, 602a, and 602b) may be referred to as processing elements, thread slots, or thread units, as described above. As illustrated, architecture state registers 601a are replicated in architecture state registers 601b, so individual architecture states/contexts are capable of being stored for logical processor 601a and logical processor 601b. In core 601, other smaller resources, such as instruction pointers and renaming logic in allocator and renamer block 630 may also be replicated for threads 601a and 601b. Some resources, such as re-order buffers in reorder/retirement unit 635, ILTB 620, load/store buffers, and queues may be shared through partitioning. Other resources, such as general purpose internal registers, page-table base register(s), low-level data-cache and data-TLB 615, execution unit(s) 640, and portions of out-of-order unit 635 are potentially fully shared.

Processor 600 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 601 includes a simplified, representative out-of-order (OOO) processor core. But an in-order processor may be utilized in different embodiments. The OOO core includes a branch target buffer 620 to predict branches to be executed/taken and an instruction-translation buffer (I-TLB) 620 to store address translation entries for instructions.

Core 601 further includes decode module 625 coupled to fetch unit 620 to decode fetched elements. Fetch logic, in one embodiment, includes individual sequencers associated with thread slots 601a, 601b, respectively. Usually core 601 is associated with a first ISA, which defines/specifies instructions executable on processor 600. Often machine code instructions that are part of the first ISA include a portion of the instruction (referred to as an opcode), which references/specifies an instruction or operation to be performed. Decode logic 625 includes circuitry that recognizes these instructions from their opcodes and passes the decoded instructions on in the pipeline for processing as defined by the first ISA. For example, decoders 625, in one embodiment, include logic designed or adapted to recognize specific instructions, such as transactional instruction. As a result of the recognition by decoders 625, the architecture or core 601 takes specific, predefined actions to perform tasks associated with the appropriate instruction. It is important to note that any of the tasks, blocks, operations, and methods described herein may be performed in response to a single or multiple instructions, some of which may be new or old instructions.

In one example, allocator and renamer block 630 includes an allocator to reserve resources, such as register files to store instruction processing results. However, threads 601a and 601b are potentially capable of out-of-order execution, where allocator and renamer block 630 also reserves other resources, such as reorder buffers to track instruction results. Unit 630 may also include a register renamer to rename program/instruction reference registers to other registers internal to processor 600. Reorder/retirement unit 635 includes components, such as the reorder buffers mentioned above, load buffers, and store buffers, to support out-of-order execution and later in-order retirement of instructions executed out-of-order.

Scheduler and execution unit(s) block 640, in one embodiment, includes a scheduler unit to schedule instructions/operation on execution units. For example, the scheduler unit may schedule operations of a loop according to a pipelined schedule. Register files associated with the execution units are also included to store information instruction processing results. Exemplary execution units include a floating point execution unit, an integer execution unit, a jump execution unit, a load execution unit, a store execution unit, and other known execution units.

One or both of cores 601 and 602 may include a corresponding alias register file (642 or 646), and corresponding register assignment logic (644 or 648) to assign alias registers of the corresponding alias register file (642 or 646) to each of a plurality of operations of a loop in accordance with embodiments of the present invention. The alias registers may be used to identify aliases in accordance with embodiments of the present invention.

Lower level data cache and data translation buffer (D-TLB) 651 are coupled to execution unit(s) 640. The D-TLB 651 is to store recent virtual/linear to physical address translations. As a specific example, a processor may include a page table structure to break physical memory into a plurality of virtual pages.

Here, cores 601 and 602 share access to higher-level or further-out cache 610, which is to cache recently fetched elements. Note that higher-level or further-out refers to cache levels increasing or getting further away from the execution unit(s). In one embodiment, higher-level cache 610 is a last-level data cache—last cache in the memory hierarchy on processor 600—such as a second or third level data cache. However, higher level cache 610 is not so limited, as it may be associated with or includes an instruction cache. A trace cache—a type of instruction cache—instead may be coupled after decoder 625 to store recently decoded traces.

In the depicted configuration, processor 600 also includes bus interface module 605. Historically, controller 670 has been included in a computing system external to processor 600. In this scenario, bus interface 605 is to communicate with devices external to processor 600, such as system memory 675, a chipset (often including a memory controller hub to connect to memory 675 and an I/O controller hub to connect peripheral devices), a memory controller hub, a northbridge, or other integrated circuit. And in this scenario, bus 605 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 675 may be dedicated to processor 600 or shared with other devices in a system. Common examples of types of memory 675 include DRAM, SRAM, non-volatile memory (NV memory), and other known storage devices.

Note that device 680 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 670 is illustrated as part of processor 600. Recently, as more logic and devices are being integrated on a single die, such as SOC, each of these devices may be incorporated on processor 600. For example in one embodiment, memory controller hub 670 is on the same package and/or die with processor 600. Here, a portion of the core (an on-core portion) includes one or more controller(s) 670 for interfacing with other devices such as memory 675 or a graphics device 680. The configuration including an interconnect and controllers for interfacing with such devices is often referred to as an on-core (or un-core configuration). As an example, bus interface 605 includes a ring interconnect with a memory controller for interfacing with memory 675 and a graphics controller for interfacing with graphics device 680. Yet, in the SOC environment, even more devices, such as the network interface, co-processors, memory 675, graphics device 680, and any other known computer devices/interface may be integrated on a single die or integrated circuit to provide small form factor with high functionality and low power consumption.

Figure 7:
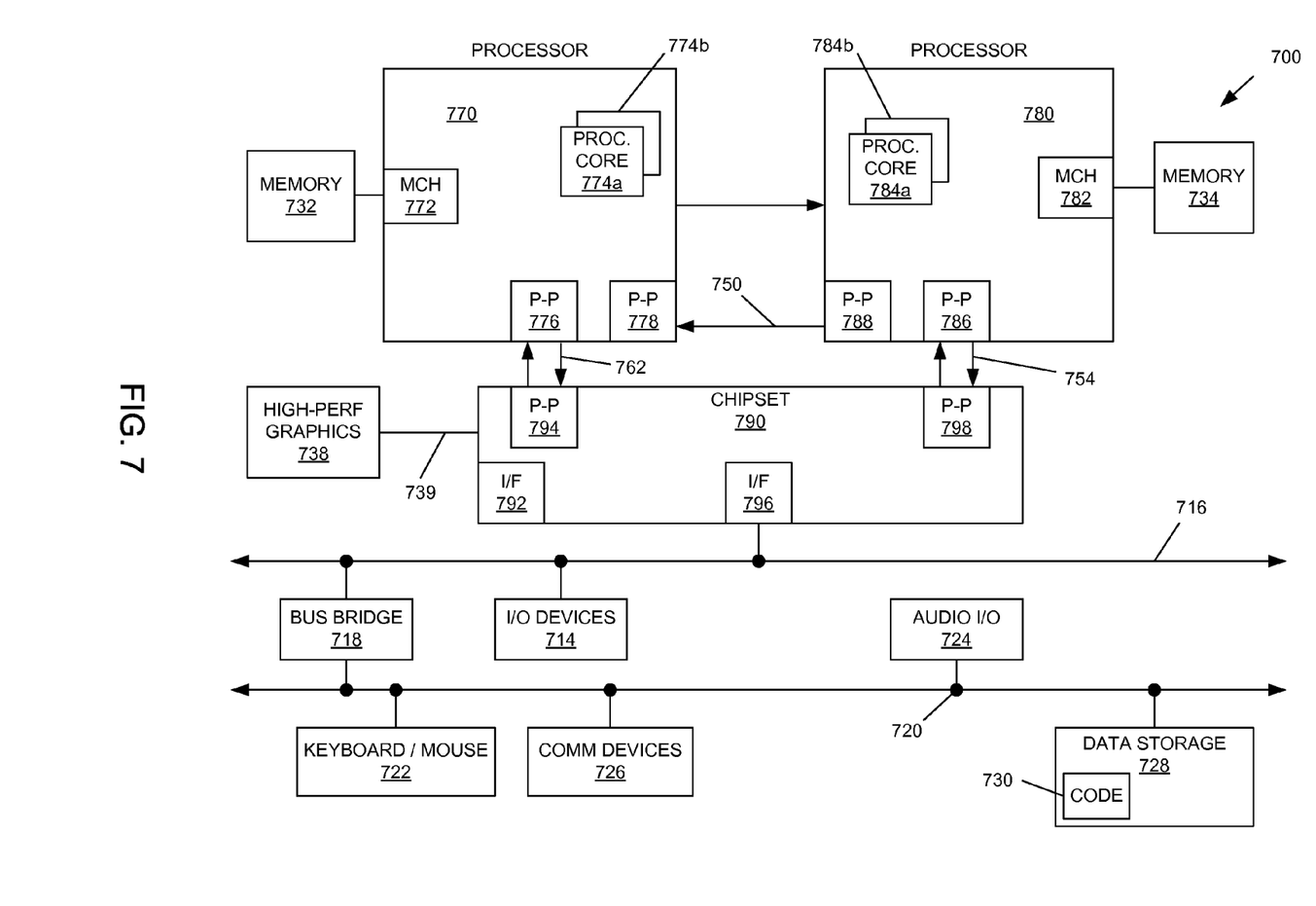
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774*a* and 774*b* and processor cores 784*a* and 784*b*), although potentially many more cores may be present in the processors.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. Each of the processors 770 and 780 may include alias registers in a register file (not shown) and register assignment logic (not shown) to assign the alias registers to each of a plurality of memory access operations of a loop, according to embodiments of the present invention. The alias registers may be utilized to detect aliases that may arise due to pipelined scheduling of the operations of the loop, according to embodiments of the present invention.

First processor 770 and second processor 780 may be coupled to a chipset 790 via P-P interconnects 762 and 754, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, Ultrabook™, tablet computer, netbook, and so forth.

The following examples pertain to further embodiments.

In a first example, a system includes a processor including one or more cores. The processor also includes a register file including a plurality of alias registers to store memory range information associated with a plurality of operations of a loop. The memory range information references one or more memory locations within a memory. The processor also includes register assignment logic for assigning each of the alias registers to a corresponding operation of the loop. The assignments may be made according to a rotation schedule and at least one of the alias registers is assigned to a first operation in a first iteration of the loop and to a second operation in a subsequent iteration of the loop. The system also includes the memory coupled to the processor. Optionally, the processor further includes instruction schedule logic for scheduling the operations of the loop according to a pipelined schedule, where at least one operation of the loop is to be executed according to an execution schedule that differs from an order of the operations of the loop. Optionally, one of the one or more cores may perform a comparison of data stored in a first alias register to data stored in at least one other of the alias registers to determine whether an alias exists. Optionally, a first alias register may be assigned to the first operation for a first lifetime and the first alias register may be assigned to the second operation for a second lifetime, where the first lifetime and the second lifetime are non-overlapping time periods. Optionally, the first lifetime is within a first iteration of the loop and the second lifetime is within a second iteration of the loop that is a sequentially next iteration to the first iteration. Optionally, the register assignment logic may execute a rotation cleanup instruction to erase contents of each alias register whose associated lifetime is expired.

In a second example, at least one computer readable medium includes instructions that when executed enable a system to assign each of a plurality of alias registers of a rotating register file to a corresponding operation of a loop in succession according to a rotation sequence for a plurality of iterations of the loop, where each alias register is to store an indication of one or more memory locations accessed by the corresponding operation and one of the alias registers is to be assigned to a first operation in a first iteration of the loop and to a second operation in a subsequent iteration of the loop. The at least one computer readable medium also includes instructions to determine whether an alias condition exists by comparison of contents of at least one of the assigned alias registers to contents of one or more other assigned alias registers. A first alias register may assigned to the first operation for a first lifetime and the first alias register is assigned to the second operation for a second lifetime, where the first lifetime and the second lifetime are non-overlapping time periods. Optionally, the first lifetime and the second lifetime are in sequentially adjacent iterations of the loop. Optionally, the first lifetime and the second lifetime are in non-adjacent iterations of the loop. Optionally, the at least one computer readable medium includes additional instructions that when executed enable the system to assign a lifetime to an operation based on an ordered relationship to another operation within the same or a different iteration and to assign the corresponding alias register to the operation for a time duration of the lifetime. Optionally, the at least one computer readable medium further includes instructions that enable the system to re-assign the corresponding alias register to another operation in another iteration upon expiration of the time duration. Optionally, the at least one computer readable medium further includes instructions that enable the system to check for an alias responsive to existence of an ordered relationship, where the ordered relationship is indicated responsive to the first operation of the loop scheduled, according to a pipelined schedule, to execute after the second operation of the loop, and to an indication in the loop that first operation of the loop is executable prior to the second operation of the loop.

In a third example, a method includes assigning each of a plurality of alias registers of a register file to a corresponding operation of a loop in succession according to a rotation sequence for a plurality of iterations of the loop, including assigning one of the alias registers to a first operation in a first iteration of the loop and to a second operation in a subsequent iteration of the loop, where each alias register is to store an indication of memory locations accessed by the corresponding operation. The method also includes determining whether an alias condition exists by comparison of contents of at least one of the assigned alias registers to contents of one or more other assigned alias registers. Optionally, the method includes assigning a first alias register to the first operation for a first lifetime and assigning the first alias register to the second operation for a second lifetime, where the first lifetime and the second lifetime are non-overlapping time periods. Optionally, the first lifetime and the second lifetime are in sequentially adjacent iterations of the loop. Optionally, the method includes assigning a first alias register to the second operation in a first iteration of the loop for a first lifetime and assigning the first alias register to the first operation of a second iteration of the loop for a second lifetime, where the first lifetime and the second lifetime are non-overlapping time periods. Optionally, the method includes assigning a lifetime to an operation based on an ordered relationship to another operation within the same iteration or a different iteration, and assigning the corresponding alias register to the operation for a time duration of the lifetime. Optionally, the method includes re-assigning the corresponding alias register to another operation in another iteration upon expiration of the time duration. Optionally, the method includes determining whether an alias exists in a first iteration of the loop by comparing contents of the first alias register assigned to the first operation of the loop with contents of a second alias register assigned to the second operation for a second lifetime associated with the second operation, where the second lifetime is determined by a first scheduled execution time of the first operation relative to a second scheduled execution time of the second operation. Optionally, the method includes checking for an alias responsive to existence of an ordered relationship, where the ordered relationship is indicated responsive to the first operation of the loop scheduled, according to a pipelined schedule, to execute after the second operation of the loop, and responsive to an indication in the loop that first operation of the loop is executable prior to the second operation of the loop.

In a fourth example, an apparatus is configured to perform the method of the third example, including one or more of the options.

In a fifth example, a processor includes one or more cores, a register file including a plurality of alias registers to store memory range information associated with a plurality of operations of a loop, where the memory range information references one or more memory locations within a memory, and register assignment logic to assign each of the alias registers to a corresponding operation of the loop. The assignments may be made according to a rotation schedule, where at least one of the alias registers is assigned to a first operation in a first iteration of the loop and to a second operation in a subsequent iteration of the loop. The system also includes the memory coupled to the processor. Optionally, the processor further includes instruction schedule logic to schedule the operations of the loop according to a pipelined schedule, where at least one operation of the loop is to be executed according to an execution schedule that differs from an order of the operations of the loop. Optionally, one of the one or more cores is to perform a comparison of data stored in a first alias register to data stored in at least one other of the alias registers to determine whether an alias exists. Optionally, a first alias register is to be assigned to the first operation for a first lifetime and the first alias register is to be assigned to the second operation for a second lifetime, where the first lifetime and the second lifetime are non-overlapping time periods. Optionally, the first lifetime is within a first iteration of the loop and the second lifetime is within a second iteration of the loop that is a sequentially next iteration to the first iteration. Optionally, the register assignment logic is further to execute a rotation cleanup instruction to erase contents of each alias register whose associated lifetime is expired.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a processor including:
      one or more cores;
      a register file including a plurality of alias registers to store memory range information associated with a plurality of operations of a loop, wherein the memory range information references one or more memory locations within a memory to be accessed when an operation of the plurality of operations is to execute; and register assignment logic to assign one of the alias registers to a corresponding operation of the loop, wherein the assignments are made according to a rotation schedule, wherein a first alias register is assigned to a first operation in a first iteration of the loop and to a second operation in a subsequent iteration of the loop; and alias detection logic to perform a comparison of data stored in the first alias register to data stored in at least one other of the alias registers to determine whether an alias condition exists; and wherein the memory is coupled to the processor.

2. The system of claim 1, wherein the processor further comprises instruction schedule logic to schedule the operations of the loop according to a pipelined schedule, wherein at least one operation of the loop is to be executed according to an execution schedule that differs from an order of the plurality of operations of the loop.

3. The system of claim 1, wherein the first alias register is to be assigned to the first operation for a first lifetime and the first alias register is to be assigned to the second operation for a second lifetime, wherein the first lifetime and the second lifetime are non-overlapping time periods.

4. The system of claim 3, wherein the first lifetime is within the first iteration of the loop and the second lifetime is within a second iteration of the loop that is a sequentially next iteration to the first iteration.

5. The system of claim 1, wherein the register assignment logic is to execute a rotation cleanup instruction to erase contents of each alias register whose associated lifetime is expired.

6. At least one non-transitory computer readable medium including instructions that when executed enable a system to:

assign each of a plurality of alias registers of a rotating register file of a processor to a corresponding operation of a loop in succession according to a rotation sequence for a plurality of iterations of the loop, wherein each alias register is to store an indication of one or more memory locations accessed by the corresponding operation and one of the alias registers is to be assigned to a first operation in a first iteration of the loop and to a second operation in a subsequent iteration of the loop; and determine, in an alias detection logic of the processor, whether an alias condition exists by comparison of contents of at least one of the assigned alias registers to contents of one or more other assigned alias registers of the rotating register file.

7. The non-transitory computer readable medium of claim 6, wherein a first alias register is assigned to the first operation for a first lifetime and the first alias register is assigned to the second operation for a second lifetime, wherein the first lifetime and the second lifetime are non-overlapping time periods.

8. The non-transitory computer readable medium of claim 7, wherein the first lifetime and the second lifetime are in sequentially adjacent iterations of the loop.

9. The non-transitory computer readable medium of claim 7, wherein the first lifetime and the second lifetime are in non-adjacent iterations of the loop.

10. The non-transitory computer readable medium of claim 6, further comprising instructions that enable the system to:

assign a lifetime to an operation based on an ordered relationship to another operation within the same or a different iteration; and assign the corresponding alias register to the operation for a time duration of the lifetime.

11. The non-transitory computer readable medium of claim 10, further comprising instructions that enable the system to re-assign the corresponding alias register to another operation in another iteration upon expiration of the time duration.

12. A method comprising:

assigning each of a plurality of alias registers of a register file to a corresponding operation of a loop in succession according to a rotation sequence for a plurality of iterations of the loop, including assigning one of the alias registers to a first operation in a first iteration of the loop and to a second operation in a subsequent iteration of the loop, wherein each alias register is to store an indication of memory locations accessed by the corresponding operation;

determining whether an alias condition exists by comparison of contents of at least one of the assigned alias registers to contents of one or more other assigned alias registers; and responsive to determining that the alias condition exists, executing recovery code to perform at least one of roll-back to a previous iteration of the loop and re-order of one or more operations of the loop.

13. The method of claim 12, further comprising assigning a first alias register to the first operation for a first lifetime and assigning the first alias register to the second operation for a second lifetime, wherein the first lifetime and the second lifetime are non-overlapping time periods.

14. The method of claim 13, wherein the first lifetime and the second lifetime are in sequentially adjacent iterations of the loop.

15. The method of claim 12, further comprising assigning a first alias register to the first operation in the first iteration of the loop for a first lifetime and assigning the first alias register to the second operation in a second iteration of the loop for a second lifetime, wherein the first lifetime and the second lifetime are non-overlapping time periods.

16. The method of claim 12, further comprising assigning a lifetime to an operation based on an ordered relationship to another operation within the same iteration or a different iteration, and assigning a corresponding alias register to the operation for a time duration of the lifetime.

17. The method of claim 16, further comprising re-assigning the corresponding alias register to another operation in another iteration upon expiration of the time duration.

18. The method of claim 12, further comprising determining whether an alias exists in the first iteration of the loop by comparing contents of a first alias register assigned to the first operation of the loop with contents of a second alias register assigned to the second operation for a second lifetime associated with the second operation, wherein the second lifetime is determined by a first scheduled execution time of the first operation relative to a second scheduled execution time of the second operation.

19. The method of claim 12, further comprising checking for an alias responsive to existence of an ordered relationship, wherein the ordered relationship is indicated responsive to:

the first operation of the loop scheduled, according to a pipelined schedule, to execute after the second operation of the loop; and an indication in the loop that first operation of the loop is executable prior to the second operation of the loop.

* * * * *